(12) United States Patent
Hyun et al.

(10) Patent No.: US 11,901,499 B2
(45) Date of Patent: Feb. 13, 2024

(54) BATTERY CASE AND BATTERY

(71) Applicant: SAMSUNG ELECTRONICS CO., LTD., Suwon-si (KR)

(72) Inventors: Song Won Hyun, Yongin-si (KR); In Kim, Suwon-si (KR); Kyeong Pang, Suwon-si (KR); Moo Ho Lee, Suwon-si (KR); Hye Jeong Lee, Suwon-si (KR); In Su Lee, Hwaseong-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 85 days.

(21) Appl. No.: 16/851,617

(22) Filed: Apr. 17, 2020

(65) Prior Publication Data

US 2020/0335732 A1 Oct. 22, 2020

(30) Foreign Application Priority Data

Apr. 22, 2019 (KR) ........................ 10-2019-0046924

(51) Int. Cl.

| | |
|---|---|
| *H01M 10/0525* | (2010.01) |
| *H01M 50/24* | (2021.01) |
| *H01M 50/55* | (2021.01) |
| *H01M 50/553* | (2021.01) |
| *H01M 50/122* | (2021.01) |
| *H01M 50/117* | (2021.01) |
| *H01M 50/131* | (2021.01) |

(Continued)

(52) U.S. Cl.
CPC ..... *H01M 10/0525* (2013.01); *H01M 50/117* (2021.01); *H01M 50/121* (2021.01); *H01M 50/122* (2021.01); *H01M 50/131* (2021.01); *H01M 50/141* (2021.01); *H01M 50/157* (2021.01); *H01M 50/16* (2021.01); *H01M 50/162* (2021.01); *H01M 50/24* (2021.01); *H01M 50/55* (2021.01); *H01M 50/553* (2021.01); *H01M 2220/20* (2013.01)

(58) Field of Classification Search
CPC .......................................... H01M 50/116–145
See application file for complete search history.

(56) References Cited

U.S. PATENT DOCUMENTS

| | | |
|---|---|---|
| 5,684,117 A | 11/1997 | Londa et al. |
| 7,294,431 B2 | 11/2007 | Puttaiah et al. |

(Continued)

FOREIGN PATENT DOCUMENTS

| | | |
|---|---|---|
| EP | 1299501 A2 | 4/2003 |
| JP | 2000281908 A | 10/2000 |

(Continued)

*Primary Examiner* — Matthew T Martin
*Assistant Examiner* — Bartholomew A Hornsby
(74) *Attorney, Agent, or Firm* — CANTOR COLBURN LLP (57) ABSTRACT

A composite including a polymer matrix; an inorganic moisture absorber; a ceramic filler, graphite, or a combination thereof; and a tracking resistance polymer, wherein the tracking resistance polymer includes an average bond energy between an atom forming a main chain and another atom covalently bonded to the atom that forms the main chain of about 350 kJ/mol to about 500 kJ/mol; a carbonaceous residue yield after pyrolysis of less than or equal to about 5 weight percent, based on the amount of the tracking resistance polymer before pyrolysis; or a combination thereof.

14 Claims, 2 Drawing Sheets

(51) Int. Cl.
*H01M 50/141* (2021.01)
*H01M 50/16* (2021.01)
*H01M 50/157* (2021.01)
*H01M 50/162* (2021.01)
*H01M 50/121* (2021.01)

(56) References Cited

U.S. PATENT DOCUMENTS

| | | | |
|---|---|---|---|
| 9,296,898 B2 | 3/2016 | Sybert et al. | |
| 9,343,717 B2 | 5/2016 | Gless | |
| 9,351,225 B2 | 5/2016 | Jung et al. | |
| 9,365,719 B2 | 6/2016 | Sybert et al. | |
| 9,453,128 B2 | 9/2016 | Sybert et al. | |
| 10,202,530 B2 | 2/2019 | Fujiwara et al. | |
| 2005/0170238 A1* | 8/2005 | Abu-Isa | H01M 50/112 429/82 |
| 2012/0083553 A1 | 4/2012 | Wakatsuka et al. | |
| 2014/0065461 A1* | 3/2014 | Kountz | C09K 21/14 429/120 |
| 2016/0211490 A1* | 7/2016 | Hashimoto | B32B 27/40 |
| 2017/0263899 A1* | 9/2017 | Takahagi | B32B 27/34 |
| 2018/0212208 A1* | 7/2018 | Kim | H01M 50/249 |
| 2019/0088955 A1* | 3/2019 | Bakker | H01M 6/34 |
| 2019/0264023 A1* | 8/2019 | Sakai | C08J 9/0066 |

FOREIGN PATENT DOCUMENTS

| | | |
|---|---|---|
| JP | 2004502828 A | 1/2004 |
| JP | 2007533106 A | 11/2007 |
| JP | 2010280793 A | 12/2010 |
| JP | 2017082163 A | 5/2017 |
| KR | 19990016075 A | 3/1999 |
| KR | 19990064241 A | 7/1999 |
| KR | 20010057152 A | 7/2001 |
| KR | 20030019953 A | 3/2003 |
| KR | 1020040061192 A | 7/2004 |
| KR | 20040083665 A | 10/2004 |
| KR | 1020140041472 A | 4/2014 |
| KR | 20140064889 A | 5/2014 |
| KR | 20150037332 A | 4/2015 |
| KR | 20170046685 A | 5/2017 |
| KR | 20170072000 A | 6/2017 |

* cited by examiner

BATTERY CASE AND BATTERY

CROSS-REFERENCE TO RELATED APPLICATION

This application claims priority to and the benefit of Korean Patent Application No. 10-2019-0046924 filed in the Korean Intellectual Property Office on Apr. 22, 2019, and all the benefits accruing therefrom under 35 U.S.C. § 119, the entire content of which is incorporated herein by reference.

BACKGROUND

1. Field

This disclosure relates to a composite, an article, a battery case, and a battery.

2. Description of the Related Art

As various mobile electronic devices and means of electric transportation are developed, there is continuing interest in developing a power source (e.g., a battery) for supplying them with electricity (or motive power). The battery may be accommodated in a battery case as a battery unit that can be used individually or together as a module of multiple battery units in these devices or means of transportation. Accordingly, further development of technology capable of improving properties of the battery case is needed.

SUMMARY

An embodiment provides a composite capable of providing articles having moisture transmission resistivity, tracking resistance, and heat dissipation properties.

Another embodiment provides an article including the composite.

Another embodiment provides a battery case including the composite.

Another embodiment provides a battery including the battery case.

A composite according to an embodiment includes a polymer matrix, an inorganic moisture absorber; a ceramic filler, graphite, or a combination thereof, and a tracking resistance polymer, wherein the tracking resistance polymer includes an average bond energy between an atom forming a main chain and another atom covalently bonded to the atom that forms the main chain in the tracking resistance polymer of about 350 kilojoules per mole (kJ/mol) to about 500 kJ/mol; a carbonaceous residue yield after pyrolysis of less than or equal to about 5 weight percent (wt %), based on the amount of the tracking resistance polymer before pyrolysis; or a combination thereof.

The polymer matrix may include high density polyethylene (HDPE), a liquid crystal polymer (LCP), or a combination thereof.

The tracking resistance polymer having an average bond energy between an atom forming a main chain and another atom covalently bonded to the atom that forms the main chain of about 350 kJ/mol to about 500 kJ/mol may include, for example, poly(tetrafluoroethylene) (PTFE), poly(ethylene tetrafluoroethylene) (PETFE), poly(vinylidene fluoride) (PVDF), poly(chlorotrifluoroethylene) (PCTFE), a copolymer thereof, or a combination thereof.

The tracking resistance polymer having a carbonaceous residue yield (char yield) after pyrolysis of less than or equal to about 5 wt % based on the amount of the tracking resistance polymer before pyrolysis may include polybutylene terephthalate, polyethylene, a copolymer thereof, or a combination thereof.

The inorganic moisture absorber may include a silica gel, a zeolite, CaO, BaO, $MgSO_4$, $Mg(ClO_4)_2$, MgO, $P_2O_5$, $Al_2O_3$, $CaH_2$, NaH, $LiAH_4$, $CaSO_4$, $Na_2SO_4$, $CaCO_3$, $K_2CO_3$, $CaCl_2$, $Ba(ClO_4)_2$, Ca, or a combination thereof.

The inorganic moisture absorber may include MgO, CaO, a zeolite, or a combination thereof.

The ceramic filler may include a ceramic filler having a thermal conductivity of greater than or equal to about 20 watts per millikelvin (W/mK).

The ceramic filler may include BN (boron nitride), AlN (aluminum nitride), $Al_2O_3$ (aluminum oxide), SiC (silicon carbide), BeO (beryllium oxide), or a combination thereof.

The graphite may include expanded graphite.

The polymer matrix may be included in the composite in an amount of less than or equal to about 85 wt % based on a total weight of the composite.

The tracking resistance polymer may be included in the composite in an amount of less than or equal to about 35 wt %, based on a total weight of the composite.

The inorganic moisture absorber may be included in the composite in an amount of less than or equal to about 20 wt % based on a total weight of the composite.

The ceramic filler, graphite, or a combination thereof may be included in the composite an amount of less than or equal to about 20 wt % based on a total weight of the composite.

An article according to another embodiment includes the composite according to an embodiment.

The article may have a water vapor transmission rate (WVTR) of less than about 0.007 grams per square meter per day ($g/m^2$/day) as measured at a thickness of 1 millimeter (mm) at 38° C. under relative humidity of 100% according to ISO 15106 and ASTM F1249, a comparative tracking index (CTI) of greater than or equal to about 200 volts as measured according to UL 746A, ASTM D3638, or IEC60112, a thermal conductivity of greater than or equal to about 0.40 watts peer millikelvin (W/mK) as measured by a laser flash, and a tensile strength of greater than or equal to about 1,000 kilograms per square centimeter ($kgf/cm^2$) as measured according to ASTM D638 using Universal Testing Machine (UTM).

A battery case according to another embodiment includes a container configured to accommodate an electrode assembly, wherein the container includes a bottom wall, a plurality of side walls, and an open side opposed to the bottom wall, wherein the bottom wall and the plurality of side walls are integrated to provide a space for accommodating the electrode assembly, and wherein at least one of the bottom wall and the plurality of side walls has a water vapor transmission rate (WVTR) of less than about 0.007 $g/m^2$/day as measured at a thickness of 1 mm at 38° C. under relative humidity of 100% according to ISO 15106 and ASTM F1249, a comparative tracking index (CTI) of greater than or equal to about 200 volts as measured according to UL 746A, ASTM D3638, or IEC60112, a thermal conductivity of greater than or equal to about 0.40 W/mK as measured by a laser flash, and a tensile strength of greater than or equal to about 1,000 $kgf/cm^2$ as measured according to ASTM D638 using UTM (Universal Testing Machine).

The battery case may further include a lid configured to cover at least a portion of the open side and having one or more of a positive terminal and a negative terminal.

At least one of the bottom wall, the plurality of side walls, and the lid may include a composite, wherein the composite includes a polymer matrix; an inorganic moisture absorber;

a ceramic filler, graphite, or a combination thereof, and a tracking resistance polymer, and wherein the tracking resistance polymer includes an average bond energy between an atom forming a main chain and another atom covalently bonded to the atom that forms the main chain of about 350 kJ/mol to about 500 kJ/mol; a carbonaceous residue yield of less than or equal to about 5 weight percent, based on the amount of the tracking resistance polymer before pyrolysis; or a combination thereof.

A battery according to another embodiment includes a battery case according to an embodiment and an electrode assembly that is accommodated in the container of the battery case and includes a positive electrode and a negative electrode.

The electrode assembly may include an electrode assembly for a rechargeable lithium battery.

A composite according to an embodiment include a polymer matrix; an inorganic moisture absorber; a ceramic filler, graphite, or a combination thereof; and a tracking resistance polymer. By molding the composite, an article having various shapes and sizes may be easily manufactured. The article has excellent moisture transmission resistivity, heat dissipation properties and tracking resistance, and therefore may be advantageously used in the manufacture of various articles requiring these characteristics. An example of the article in the prior art may be a battery case that is conventionally manufactured using a metal material. In contrast, the battery case manufactured from the composite according to an embodiment may have improved moisture transmission resistivity, heat dissipation properties, and tracking resistance, may be easily manufactured in a desired shape and size, and may be low in manufacturing cost and light in weight. In addition, the battery case according to an embodiment may be readily accommodated without the need to wrap a plurality of electrode assemblies with separate metal pouches, and thus may advantageously be used for manufacturing a battery module for an electric vehicle, and the like, for supplying large capacity power.

DETAILED DESCRIPTION

Hereinafter, embodiments are described in detail. However, these embodiments are exemplary, and the present disclosure is not limited thereto. The disclosure may be embodied in many different forms, and the embodiments should not be construed as being limited to the embodiments set forth herein.

If not defined otherwise, all terms (including technical and scientific terms) in the specification may be defined as commonly understood by one skilled in the art. The terms defined in a generally-used dictionary may not be interpreted ideally or exaggeratedly unless clearly defined. In addition, unless explicitly described to the contrary, the word "comprise" and variations such as "comprises" and "comprising," and the terms "includes" and "including" when used in the specification, will be understood to specify the inclusion of stated features, regions, integers, steps, operations, elements and/or components, but do not preclude the presence or addition of one or more other features, regions, integers, steps, operations, elements and/or components.

Further, the singular includes the plural unless mentioned otherwise. The singular forms "a," "an," and "the" are intended to include the plural forms, including "at least one," unless the content clearly indicates otherwise. "Or" means "and/or."

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

Exemplary embodiments are described herein with reference to drawings that are schematic illustrations of idealized embodiments. In the drawings, the thickness of each element is exaggerated for better comprehension and ease of description. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. Like reference numerals designate like elements throughout the specification.

It will be understood that when an element such as a layer, film, region, or plate is referred to as being "on" another element, it can be directly on another element or intervening elements may also be present therebetween. In contrast, when an element is referred to as being "directly on" another element, there are no intervening elements present therebetween.

Recently, there has been active research on developing an electric vehicle (EV) using at least one battery system to supply a part or the entire part of a motive power system. The electric vehicle discharges fewer pollutants compared with a traditional vehicle operated by an internal combustion engine, and thus shows much higher fuel efficiency. Some electric vehicles use electricity and use no gasoline and may obtain their entire motive power from electricity. As research and development of the electric vehicles are increased, there is an increased need for an improved power source, for example, an improved battery or battery module.

A rechargeable lithium battery capable of being charged and discharged and having high energy density is considered as an electrochemical device containing the battery for these electric vehicles. A rechargeable lithium battery operates at an elevated temperature and is vulnerable to moisture, so it can include an aluminum material with excellent moisture transmission resistivity. That is, an electrode assembly including positive and negative electrodes is inserted into a case, such as an aluminum pouch or an aluminum can, sealed to make a battery cell, and a plurality of the battery cells can be used to form a battery module. However, since this method requires a complicated assembly process, a long fabrication time, and a high cost, its productivity needs to be improved.

On the other hand, a conventional battery case that is formed of a metal has a limited shape, and a battery case having a desired shape and/or size requires a multistep process, a high cost, and plenty of time due to a limit in terms of a metal manufacture technology. In addition, larger metal cases are heavy due to the weight of the metal and, when a plurality of containers are included in order to house a plurality of battery cells, become heavier and even more expensive.

In order to solve the above problems, studies are being made on a battery case using a polymer material which is light in weight and easily manufactured in a desired shape. However, in case of a battery case using a polymer material, moisture transmission resistivity and mechanical strength can be insufficient, and the polymer materials often have to be further strengthened for adequate performance. Due to the characteristics of rechargeable lithium batteries operating at high temperatures, heat dissipation properties, which efficiently dissipate heat from inside the battery case to the outside, can also be challenging with some polymer materials. Furthermore, when polymer materials are used in electrical applications such as battery cases, it is also desirable to minimize or prevent tracking that forms conductive pathways on the polymer surface under certain conditions.

Accordingly, there is an increasing need for a battery case which has improved moisture transmission resistivity, tracking resistance, and heat dissipation properties, and which may be conveniently manufactured to have desired shapes and sizes while having a low manufacturing cost, such as for use in a battery case for a battery, or a battery module including the same.

The inventors have been working to develop composites that may be easily molded into desired sizes and shapes on the basis of light and inexpensive polymer resins and that may produce articles with improved moisture transmission resistivity, heat dissipation properties, and tracking resistance.

That is, the composite according to an embodiment includes a polymer matrix; an inorganic moisture absorber a ceramic filler, graphite, or a combination thereof, and a tracking resistance polymer, wherein the tracking resistance polymer includes an average bond energy between an atom forming a main chain and another atom covalently bonded to the atom that forms the main chain of about 350 kJ/mol to about 500 kJ/mol; a carbonaceous residue yield (char yield) after pyrolysis of less than or equal to about 5 weight percent, based on the amount of the tracking resistance polymer before pyrolysis; or a combination thereof.

The "tracking" is a phenomenon of forming conductive pathways formed on the polymer surface under certain conditions. Accordingly, electrical tracking may set a fire on a polymer part used for electrical appliances, and thus is a safety requirement. Conventionally, in order to improve tracking resistance of a polymer composite material, a method of including an inorganic material metal, for example, metal hydroxide, such as, aluminum hydroxide, zinc borate, titania ($TiO_2$), and the like, has been used. The metal hydroxide, such as, aluminum hydroxide, reacts carbon of a pyrolyzed polymer, and thus is gasified into volatile gas, such as, $CO_2$, CO, or the like, and also, absorbs heat generated by the discharge, and thus, prevents formation of electrically conductive carbonaceous residues (char). However, the aluminum hydroxide has insufficient compatibility with the polymer material and needs to be used in a large amount and accordingly, deteriorates mechanical properties of an article manufactured therefrom and also weakens moisture transmission resistivity. In addition, the zinc borate or titania forms an insulation area on the polymer surface as non-conductive particles but deteriorates mechanical properties of the article manufactured therefrom and also weakens moisture transmission resistivity.

On the other hand, the composite according to an embodiment includes a tracking resistant polymer and has sufficient compatibility with a polymer matrix and thus improves tracking resistance of the article manufactured therefrom but does not deteriorate mechanical properties and the like.

The tracking resistance polymer having an average bond energy between an atom forming a main chain and another atom covalently bonded to the atom that forms the main chain of about 350 kJ/mol to about 500 kJ/mol may be resistant to product degradation by a leakage current, or the like, on the surface of the article manufactured from the composite, due to the high average bond energy between the atoms. Examples of the tracking resistance polymers having high average bond energy (i.e., about 350 kJ/mol to about 500 kJ/mol) between the atoms include poly(tetrafluoroethylene) (PTFE), poly(ethylene tetrafluoroethylene) (PETFE), poly(vinylidene fluoride) (PVDF), poly(chlorotrifluoroethylene) (PCTFE), a copolymer thereof, or a combination thereof, but are not limited thereto. The aforementioned tracking resistance polymers are those that include a structure in which hydrogen atoms and/or fluorine atoms are bonded to a main polymer chain including carbon atoms. The average bond energy between a carbon atom and a hydrogen atom is 413 kJ/mol, and the average bond energy between a carbon atom and a fluorine atom is 485 kJ/mol. The average bond energy between these atoms is very high. In an embodiment, the average bond energy between an atom forming a main chain and another atom covalently bonded to the atom that forms the main chain of the tracking resistance polymer may be about 400 kJ/mol to about 500 kJ/mol, for example, about 410 kJ/mol to about 500 kJ/mol, or about 415 kJ/mol to about 500 kJ/mol.

The tracking resistance polymer having a carbonaceous residue yield (char yield) after pyrolysis of less than or equal to about 5 wt %, based on the amount of the tracking resistance polymer before pyrolysis, may be a polymer that is rarely gasified to produce a carbonaceous residue (char) during or after pyrolysis at high temperature.

Since carbon is an electrically conductive material, when the components included in the composite are decomposed at high temperatures to generate carbonaceous residues, tracking through which electricity is conducted may occur. Accordingly, as the carbonaceous residues generated during the pyrolysis is smaller, the tracking may be more effectively suppressed, and non-limiting examples of this tracking resistance polymer include polybutylene terephthalate, polyethylene including High Density Polyethylene (HDPE), a copolymer thereof, a combination thereof.

The tracking resistance effect of a polymeric material may be determined by measuring a comparative tracking index (CTI). The CTI indicates a degree of enduring a voltage in a contaminated state, and a larger CTI value indicates a better insulating material in a wet or contaminated state. The CTI may be measured according to UL 746A, ASTM D3638, or IEC60112. The CTI is expressed as voltages causing the tracking, which are measured, for example, after a total of about 50 drops of electrolyte solution (e.g., 0.1% $NH_4Cl$ aqueous solution) have fallen on a polymer sample disposed on a substrate (e.g., glass and the like) at a rate of one drop every 30 seconds. The numerical value of the voltage where a short-cut occurs due to the tracking after 50 drops of the electrolyte is the "comparative tracking index". As the CTI and hence the tracking resistance of the composite is higher, a short circuit problem and the like due to an electrical leakage among adjacently-disposed electrical parts do not occur.

As shown in the examples that follow, the articles including the tracking resistance polymer having an average bond energy between an atom forming a main chain and another atom covalently bonded to the atom that forms the main chain of about 350 kJ/mol to about 500 kJ/mol; a carbonaceous residue yield (char yield) after pyrolysis of less than or equal to about 5 wt %, based on the amount of the tracking resistance polymer before pyrolysis; or a combination thereof, in the composite according to an embodiment exhibit a CTI of greater than or equal to about 200 volts. On the contrary, articles manufactured by including titania (Comparative Example 5) or zinc borate (Comparative Example 6), which are conventionally used in the art to improve tracking resistance, exhibit CTIs of 125 volts. This CTI is similar to that of articles including no material for improving tracking resistance as shown in the other Comparative Examples. Accordingly, the composite including the tracking resistance polymer according to an embodiment has excellent tracking resistance, at least in part because the tracking resistance polymer exhibits excellent compatibility with the polymer matrix.

The tracking resistance polymer may be included in the composite in an amount of less than or equal to about 35 wt %, for example, less than or equal to about 30 wt %, less than or equal to about 25 wt %, less than or equal to about 20 wt %, or less than or equal to about 10 wt %, and for example, greater than 5 wt %, or greater than or equal to about 10 wt %, for example, greater than 5 wt % to about 35 wt %, greater than 5 wt % to about 30 wt %, about 10 wt % to about 35 wt %, about 10 wt % to about 30 wt %, about 10 wt % to about 25 wt %, about 10 wt % to about 20 wt % based on a total weight of the composite. Within the range of less than or equal to about 35 wt % based on a total weight of the composite, the tracking resistance polymer may be included in any subrange other than these specific subranges as well.

By including the tracking resistance polymer in the above ranges of amount, the tracking resistance of an article made from the composite including the same may be improved. When the content of the tracking resistance polymer exceeds about 35 wt % based on the total weight of the composite, other characteristics such as mechanical properties, moisture transmission resistivity, and other properties of the article manufactured therefrom may be deteriorated. When the content of the tracking resistance polymer is less than or equal to 5 wt % based on the total weight of the composite, the tracking resistance of the article produced therefrom may be negligible.

Within the content ranges, the tracking resistance polymer may include a polymer having an average bond energy between an atom forming the main chain and another atom covalently bonded to the atom that forms the main chain of about 350 kJ/mol to about 500 kJ/mol; a polymer having a carbonaceous residue yield (char yield) after pyrolysis of less than or equal to about 5 weight percent, based on the amount of the tracking resistance polymer before pyrolysis; or a combination thereof. In an embodiment, the tracking resistance polymer having an average bond energy between an atom forming a main chain and another atom covalently bonded to the atom that forms the main chain of about 350 kJ/mol to about 500 kJ/mol may be poly(tetrafluoroethyl-ene) (PTFE), and the tracking resistance polymer having a carbonaceous residue yield (char yield) after pyrolysis of less than or equal to about 5 weight percent, based on the amount of the tracking resistance polymer before pyrolysis may be polybutylene terephthalate (PBT), polyethylene, for example, high density polyethylene (HDPE), or a combination thereof, but are not limited thereto.

The polymer matrix included in the composite may include any polymer having suitable moisture transmission resistivity, excellent mechanical properties, and good moldability. For example, the polymer matrix may include high density polyethylene (HDPE), which offers the benefits of being inexpensive, and having excellent mechanical properties and moisture transmission resistivity. In another example, the polymer matrix may include a liquid crystal polymer (LCP), which are more expensive than HDPE, but the LCPs have high mechanical properties, moisture transmission resistivity, and flame retardancy.

In an embodiment, the polymer matrix may include high density polyethylene (HDPE), a liquid crystal polymer (LCP), or a combination thereof, but the polymer matrix is not limited thereto. In an embodiment, the polymer matrix may include HDPE or LCP. In another embodiment, the polymer matrix may include a combination of HDPE and LCP.

In an embodiment, the liquid crystal polymer may include a liquid crystal aromatic polyester. The liquid crystal aromatic polyester may include a structural unit represented by Chemical Formula 1; a structural unit represented by Chemical Formula 2 and a structural unit represented by Chemical Formula 3; or a structural unit represented by Chemical Formula 1, a structural unit represented by Chemical Formula 2, and a structural unit represented by Chemical Formula 3:

Chemical Formula 1

Chemical Formula 2

Chemical Formula 3

In Chemical Formulae 1 to 3, $Ar^1$, $Ar^2$, and $Ar^3$ are each independently a group including a substituted or unsubstituted C6 to C30 aromatic cyclic group, for example a substituted or unsubstituted C6 to C30 aromatic cyclic group including a single ring, a substituted or unsubstituted C6 to C30 aromatic cyclic group including two or more condensed rings, or a substituted or unsubstituted C6 to C30 aromatic cyclic group including two or more rings that are linked by a single bond, —O—, —C(=O)—, —C(OH)$_2$—, —S—, or —S(O)$_2$—.

For example, $Ar^1$, $Ar^2$, and $Ar^3$ of Chemical Formulae 1 to 3 may each independently be a substituted or unsubstituted phenylene group, a biphenylene group, a naphthylene group, an anthracenylene group, a phenanthracenylene group, a naphthacenylene group, or a pyrenylene group, and the like, for example, a phenylene group, a biphenylene group, or a naphthylene group, but are not limited thereto.

The structural unit represented by Chemical Formula 1 may be derived from aromatic hydroxycarboxylic acid, and the aromatic hydroxycarboxylic acid may be at least one selected from 4-hydroxybenzoic acid, glycolic acid, 6-hydroxy-2-naphthoic acid, 6-hydroxy-1-naphthoic acid, 3-methyl-4-hydroxybenzoic acid, 3,5-dimethyl-4-hydroxybenzoic acid, 2,6-dimethyl-4-hydroxybenzoic acid, 3-methoxy-4-hydroxybenzoic acid, 3,5-dimethoxy-4-hydroxybenzoic acid, 6-hydroxy-5-methyl-2-naphthoic acid, 6-hydroxy-5-methoxy-2-naphthoic acid, 2-chloro-4-hy- droxybenzoic acid, 3-chloro-4-hydroxybenzoic acid, 2,3-dichloro-4-hydroxybenzoic acid, 3,5-dichloro-4-hydroxybenzoic acid, 2,5-dichloro-4-hydroxybenzoic acid, 3-bromo-4-hydroxybenzoic acid, 6-hydroxy-5-chloro-2-naphthoic acid, 6-hydroxy-7-chloro-2-naphthoic acid, 6-hydroxy-5,7-dichloro-2-naphthoic acid, or p-β-hydroxyethoxybenzoic acid, for example, 4-hydroxybenzoic acid and/or 6-hydroxy-2-naphthoic acid, but is not limited thereto.

The structural unit represented by Chemical Formula 2 may be derived from aromatic dicarboxylic acid, and the aromatic dicarboxylic acid may be at least one selected from terephthalic acid, 4,4'-biphenyldicarboxylic acid, 4,4'-terphenyldicarboxylic acid, 1,6-naphthalene dicarboxylic acid, 2,6-naphthalene dicarboxylic acid, 1,4-naphthalene dicarboxylic acid, 2,7-naphthalene dicarboxylic acid, diphenyl ether-4,4'-dicarboxylic acid, diphenoxyethane-4,4'-dicarboxylic acid, diphenoxy butane-4,4'-dicarboxylic acid, diphenyl ethane-4,4'-dicarboxylic acid, isophthalic acid, diphenyl ether-3,3'-dicarboxylic acid, diphenoxyethane-3,3'-dicarboxylic acid, diphenyl ethane-3,3'-dicarboxylic acid, chloro terephthalic acid, dichloroterephthalic acid, dichloroisophthalic acid, bromo terephthalic acid, methylterephthalic acid, dimethylterephthalic acid, ethyl terephthalic acid, methoxy terephthalic acid, or ethoxyterephthalic acid, for example, terephthalic acid, isophthalic acid, naphthalene dicarboxylic acid, or a combination thereof, but is not limited thereto.

The structural unit represented by Chemical Formula 3 may be derived from aromatic diol, and the aromatic diol may be catechol, resorcinol, hydroquinone, 4,4'-dihydroxybiphenyl, 2,2-bis(4'-β-hydroxyethoxyphenyl) propane, bis(4-hydroxyphenyl) sulfone, bis(4-β-hydroxyethoxyphenyl) sulfonic acid, 9,9'-bis(4-hydroxyphenyl) fluorene, 3,3'-dihydroxybiphenyl, 4,4'-dihydroxyterphenyl, 2,6-naphthalenediol, 4,4'-dihydroxydiphenyl ether, bis(4-hydroxyphenoxy) ethane, 3,3'-dihydroxydiphenyl ether, 1,6-naphthalenediol, 2,2-bis(4-hydroxyphenyl) propane, bis(4-hydroxyphenyl) methane, chloro hydroquinone, methylhydroquinone, tert-butyl hydroquinone, phenyl hydroquinone, methoxy hydroquinone, phenoxyhydroquinone, 4-chloro resorcinol, or 4-methyl resorcinol, for example, hydroquinone, 4,4'-dihydroxybiphenyl, or a combination thereof, but is not limited thereto.

In an embodiment, the liquid crystal aromatic polymer may include a liquid crystal aromatic polyamide and the liquid crystal aromatic polyamide may include a structural unit represented by Chemical Formula 4; a structural unit represented by Chemical Formula 5 and the structural unit represented by Chemical Formula 2; or a structural unit represented by Chemical Formula 4, a structural unit represented by Chemical Formula 5, and a structural unit represented by Chemical Formula 2:

Chemical Formula 4

Chemical Formula 5

Chemical Formula 2

In Chemical Formula 4, Chemical Formula 5, and Chemical Formula 2, $Ar^4$, $Ar^5$, and $Ar^2$ are each independently a group including a substituted or unsubstituted C6 to C30 aromatic cyclic group, for example a substituted or unsubstituted C6 to C30 aromatic group including a single ring, a substituted or unsubstituted C6 to C30 aromatic cyclic group including two or more condensed rings, or a substituted or unsubstituted C6 to C30 aromatic cyclic group including two or more rings that are linked by a single bond, —O—, —C(=O)—, —C(OH)$_2$—, —S—, or —S(O)$_2$—.

For example, $Ar^4$, $Ar^5$, and $Ar^2$ of Chemical Formula 4, Chemical Formula 5, and Chemical Formula 2 may each independently be a phenylene group, biphenylene group, a naphthylene group, an anthracenylene group, phenanthracenylene group, a naphthacenylene group, or a pyrenylene group, and the like, for example, a phenylene group, a biphenylene group, or a naphthylene group, but are not limited thereto.

The structural unit represented by Chemical Formula 4 may be derived from aromatic amino carboxylic acid and the aromatic amino carboxylic acid may be for example, 4-aminobenzoic acid, 2-amino-naphthalene-6-carboxylic acid, 4-aminobiphenyl-4-carboxylic acid, or a combination thereof, but is not limited thereto.

The structural unit represented by Chemical Formula 5 may be derived from an aromatic diamine and the aromatic diamine may be at least one of 1,4-phenylene diamine, 1,3-phenylene diamine, 2,6-naphthalene diamine, N,N,N',N'-tetramethyl-1,4-diaminobenzene, N,N,N',N'-tetramethyl-1,3-diaminobenzene, 1,8-bis(dimethylamino)naphthalene, or 4,5-bis(dimethylamino) fluorene, for example, 1,4-phenylene diamine, 1,3-phenylene diamine, 2,6-naphthalene diamine, or a combination thereof, but is not limited thereto.

The structural unit represented by Chemical Formula 2 may be derived from the above-described aromatic dicarboxylic acid and the aromatic dicarboxylic acid may be, for example, terephthalic acid, isophthalic acid, naphthalene dicarboxylic acid, or a combination thereof.

In an embodiment, the liquid crystal polymer may include a liquid crystal aromatic polyester including (1) a structural unit represented by Chemical Formula 6; (2) a structural unit represented by Chemical Formula 7 and a structural unit represented by Chemical Formula 8; (3) a structural unit represented by Chemical Formula 7 and a structural unit represented by Chemical Formula 9; (4) a structural unit represented by Chemical Formula 7, a structural unit represented by Chemical Formula 8, and a structural unit represented by Chemical Formula 9; or (5) a structural unit represented by Chemical Formula 6, a structural unit represented by Chemical Formula 7, a structural unit represented by Chemical Formula 8, and a structural unit represented by Chemical Formula 9:

Chemical Formula 6

Chemical Formula 7

Chemical Formula 8

Chemical Formula 9

In an embodiment, the structural unit represented by Chemical Formula 6 may be derived from p-hydroxybenzoic acid (HBA), the structural unit represented by Chemical Formula 7 may be derived from isophthalic acid (IPA) and/or terephthalic acid (TPA), the structural unit represented by Chemical Formula 8 may be derived from hydroquinone (HQ) and the structural unit represented by Chemical Formula 9 may be derived from 4,4'-biphenol (BP).

In the composite according to an embodiment, the content of the polymer matrix may be less than or equal to about 85 wt %, for example, about 30 wt % to about 85 wt %, about 35 wt % to about 85 wt %, about 40 wt % to about 85 wt %, about 45 wt % to about 85 wt %, about 50 wt % to about 85 wt %, about 55 wt % to about 85 wt %, about 55 wt % to about 80 wt %, about 60 wt % to about 80 wt %, about 65 wt % to about 80 wt %, about 65 wt % to about 75 wt %, about 70 wt % to about 75 wt % based on a total weight of the composite, but is not limited thereto.

When the content of the polymer matrix is less than about 30 wt % based on the total weight of the composite, molding can be nearly impossible, and it can be difficult to achieve minimum basic mechanical properties. When the content of the polymer matrix is greater than about 85 wt % based on the total weight of the composite, moisture transmission resistivity, tracking resistance, and heat dissipation properties may not be ensured or sufficient.

The inorganic moisture absorber included in the composite may include a silica gel, a zeolite, CaO, BaO, $MgSO_4$, $Mg(ClO_4)_2$, MgO, $P_2O_5$, $Al_2O_3$, $CaH_2$, NaH, $LiAlH_4$, $CaSO_4$, $Na_2SO_4$, $CaCO_3$, $K_2CO_3$, $CaCl_2$, $Ba(ClO_4)_2$, Ca, or a combination thereof.

In an embodiment, the inorganic moisture absorber may include a zeolite, CaO, MgO, or a combination thereof, and for example, the inorganic moisture absorber may be CaO or MgO.

As for the zeolite, when included as an inorganic moisture absorber in a composite or a battery case the same according to an embodiment, the pore size of the zeolite may be in a range of about 3 Angstrom (Å) to about 10 Å, for example, about 3 Å to about 8 Å, for example, about 3 Å to about 7 Å, for example, about 3 Å to about 5 Å. Without being bound by theory, water molecules may be easily held inside the pores of the zeolite since they have a size of about 3.8 Å. In addition, the zeolite may have an average particle diameter of about 2 micrometers ($\mu m$) to about 10 $\mu m$, and an aluminum content inside the zeolite may be in a range of greater than or equal to about 40 wt %. When the aluminum content is within the range, improved hygroscopicity may be obtained.

If the inorganic moisture absorbent is CaO, a particle size of CaO may be about 0.1 $\mu m$ to about 20 $\mu m$, for example, about 0.1 $\mu m$ to about 15 $\mu m$, about 0.1 $\mu m$ to about 10 $\mu m$, about 0.1 $\mu m$ to about 8 $\mu m$, about 0.1 $\mu m$ to about 7 $\mu m$, about 0.1 $\mu m$ to about 6 $\mu m$, about 0.1 $\mu m$ to about 5 $\mu m$, about 0.1 $\mu m$ to about 4 $\mu m$, about 0.1 $\mu m$ to about 3 $\mu m$, or about 0.1 $\mu m$ to about 2 $\mu m$, for example, about 0.1 $\mu m$ to about 1 $\mu m$, but is not limited thereto. When the particle size of CaO is larger than 20 $\mu m$, the moisture transmission resistivity may be decreased.

Zeolite is a physical moisture absorbent absorbing water through a particle having a pore, while CaO is a chemical water adsorbent adsorbing water through a chemical reaction with a water molecule. Accordingly, in an embodiment, the composite may include a zeolite and CaO together as an inorganic moisture absorber.

The inorganic moisture absorber may be included in the composite in an amount of less than or equal to about 20 wt %, for example, about 1 wt % to about 20 wt %, about 1 wt % to about 15 wt %, about 3 wt % to about 15 wt %, about 5 wt % to about 15 wt %, about 5 wt % to about 10 wt %, about 7 wt % to about 15 wt %, about 8 wt % to about 15 wt %, about 8 wt % to about 13 wt %, about 10 wt %, or about 5 wt % based on a total weight of the composite, but is not limited thereto.

If the inorganic moisture absorber is included in a composite in an amount of less than about 1 wt % based on the total weight of the composite, a moisture transmission resistivity effect may not be obtained, or a moisture absorption life-span of an article which is supposed to be used for greater than or equal to 10 years is reduced due to the small amount of the inorganic moisture absorber, and accordingly, sufficient moisture transmission resistivity performance may not be obtained. On the contrary, if the inorganic moisture absorber is increasingly included in a composite in an amount of greater than about 20 wt % based on the total weight of the composite, the inorganic moisture absorbers are agglomerated, or the agglomerated inorganic moisture absorbers become hydrophilic on the surface, and accordingly, moisture transmission resistivity may be deteriorated, and in addition, mechanical properties and molding properties of an article may be deteriorated.

The composite further includes one or more of a ceramic filler and graphite. The composite according to an embodiment includes both the ceramic filler and graphite, and accordingly, heat dissipation properties of an article manufactured therefrom may be improved.

The polymer material may have a different thermal conductivity depending on a kind thereof, but most of the polymer materials have thermal conductivity of less than about 1 watt per millikelvin (W/mK), and an article manufactured from the polymer material alone exhibits very low heat dissipation properties. A rechargeable lithium battery works at a high temperature, and accordingly, when heat generated inside a battery case is not efficiently released outside, there is a risk of explosion or fire. Accordingly, in a polymer material-containing article, heat dissipation properties may be increased by including a component having high thermal conductivity. In general, a metal has a high thermal conductivity but also conducts electricity, and accordingly, when the metal is included, tracking may occur. Accordingly, a ceramic filler having a high thermal conductivity but that is less conductive to electricity may be used, for example, a ceramic filler having thermal conductivity of greater than or equal to about 20 W/mK may be used.

Examples of the ceramic filler having thermal conductivity of greater than or equal to about 20 W/mK may include BN (boron nitride), AlN (aluminum nitride), $Al_2O_3$ (aluminum oxide), SiC (silicon carbide), BeO (beryllium oxide), or a combination thereof, but is not limited thereto. The ceramic filler is an electrical insulator having high thermal conductivity and thus may improve heat dissipation properties as well as not deteriorate tracking resistance.

In an embodiment, the ceramic filler may have a thermal conductivity of greater than or equal to about 60 W/mK, for example, greater than or equal to about 80 W/mK, or greater than or equal to about 100 W/mK. The higher the thermal conductivity, the more improved the heat dissipation properties. In an embodiment, the ceramic filler may be boron nitride (BN), and the BN has a thermal conductivity of about 120 W/mK, which is similar to the thermal conductivity of aluminum, which is 124 W/mK.

Meanwhile, as a material having heat dissipation properties, graphite may be included. Although graphite is also an electrically conductive material, the graphite may realize improved heat dissipation properties when the graphite is included at or below a certain amount without deteriorating tracking resistance. Without being bound by theory, the graphite has a sheet-shaped structure, and thus may act as a barrier to block a migration path of moisture in the composite. In this case, the graphite may have an aspect ratio, that is, a ratio of the longest diameter to the shortest diameter of greater than or equal to about 10, for example, greater than or equal to about 20, greater than or equal to about 30, greater than or equal to about 40, greater than or equal to about 50, greater than or equal to about 60, greater than or equal to about 70, greater than or equal to about 80, greater than or equal to about 90, greater than or equal to about 100, greater than or equal to about 120, greater than or equal to about 150, greater than or equal to about 180, greater than or equal to about 200, greater than or equal to about 250, greater than or equal to about 300, greater than or equal to about 350, greater than or equal to about 400, greater than or equal to about 450, greater than or equal to about 500, greater than or equal to about 600, greater than or equal to about 700, greater than or equal to about 800, greater than or equal to about 900, or greater than or equal to about 1,000, but is not limited thereto.

The graphite may include expanded graphite.

The ceramic filler, graphite, or a combination thereof may be included in the composite in an amount of less than or equal to about 20 wt %, less than or equal to about 18 wt %, less than or equal to about 17 wt %, less than or equal to about 15 wt %, less than or equal to about 13 wt %, less than or equal to about 10 wt %, less than or equal to about 8 wt %, less than or equal to about 7 wt % and for example, greater than or equal to about 1 wt %, greater than or equal to about 3 wt %, greater than or equal to about 5 wt %, greater than or equal to about 7 wt %, or greater than or equal to about 10 wt %, for example, about 1 wt % to about 20 wt %, about 3 wt % to about 20 wt %, about 5 wt % to about 20 wt %, about 5 wt % to about 17 wt %, about 5 wt % to about 15 wt %, about 5 wt % to about 13 wt %, about 5 wt % to about 10 wt %, about 5 wt % to about 8 wt %, about 7 wt % to 15 wt %, about 7 wt % to about 13 wt %, about 7 wt % to about 10 wt %, or about 10 wt % based on a total weight of the composite, but is not limited thereto.

An article manufactured from the composite according to an embodiment including the ceramic filler, graphite, or a combination thereof within the content above exhibits about twice or more as high thermal conductivity as an article not including the ceramic filler and/or graphite, and accordingly, heat dissipation properties of the article are improved. When the ceramic filler and/or graphite is increasingly included in the composite in an amount of greater than about 20 wt % based on the total weight of the composite, the mechanical properties of an article manufactured therefrom may be deteriorated. In addition, when the ceramic filler and/or graphite is included in the composite in an amount of less than about 1 wt % based on the total weight of the composite, the heat dissipation properties improvement effect of the composite may not be sufficient.

The composite according to an embodiment may further include a moisture barrier material, including those available in the art. Such moisture barrier materials may include, for example, a moisture barrier material that is a crystal of a liquid crystal polymer of the polymer matrix in the composite, a crystal that is different from those of a liquid crystal polymer of the polymer matrix, an inorganic material particle that is the same as or different from the inorganic moisture absorber, or a fiber-shaped material such as a glass fiber or a carbon fiber. Specific examples of the moisture barrier material may include wollastonite, mica, whisker, barium sulfate, kaolin, talc, nanoclay, a carbon fiber or a glass fiber having an aspect ratio of greater than or equal to about 100, or a mixture thereof, but are not limited thereto. The content of the additional moisture barrier materials in the composite may be less than or equal to about 10 wt % based on a total weight of the composite and may be, for example, about 1 wt % to about 10 wt %, about 1 wt % to about 8 wt %, or about 1 wt % to about 5 wt % based on the total weight of the composite.

As described above, the composite according to an embodiment includes the polymer matrix; the inorganic moisture absorber; a ceramic filler, graphite, or a combination thereof; and the tracking resistance polymer dispersed therein, and thereby the article according to an embodiment produced therefrom may have excellent moisture transmission resistivity, tracking resistance, and heat dissipation properties.

For example, an article according to an embodiment may have a water vapor transmission rate (WVTR) of less than about 0.007 grams per square meter per day ($g/m^2$/day) as measured at a thickness of 1 mm and 38° C. under relative humidity of 100% according to ISO 15106 and ASTM F1249 with, a comparative tracking index (CTI) of greater than or equal to about 200 volts as measured according to UL 746A, ASTM D3638, or IEC60112 o, a thermal conductivity of greater than or equal to about 0.40 W/mK as measured by a laser flash method, and a tensile strength of greater than or equal to about 1,000 kilograms per square centimeter ($kgf/cm^2$) as measured according to ASTM D638 using a Universal Testing Machine (UTM).

Since an article manufactured by molding the same liquid crystal polymer alone as used as the polymer matrix in the composite according to a comparative example described herein has a water vapor transmission rate of about 0.07 $g/m^2$/day, a water vapor transmission rate of an article manufactured from the composite according to an embodiment is greater than or equal to about 10 times decreased, and accordingly, moisture transmission resistivity thereof is greatly increased. As shown in the following examples, the article according to an embodiment may reduce a water vapor transmission rate down to about 0.0005 $g/m^2$/day by controlling the amount of the inorganic moisture absorber within the range.

In addition, tracking resistance of the article according to an embodiment is around twice increased, since the article exhibits a CTI (comparative tracking index) of greater than or equal to about 200 volts, but an article manufactured from the liquid crystal polymer alone exhibits a CTI of about 125 volts.

Furthermore, the article according to an embodiment has thermal conductivity of greater than or equal to about 0.40 W/mK, which is greatly increased compared with about 0.25 W/mK of thermal conductivity of an article manufactured from the liquid crystal polymer alone.

On the other hand, since the article manufactured from the liquid crystal polymer alone has tensile strength of about 1,600 $kgf/cm^2$, tensile strength of the article according to an embodiment is a little decreased. However, a content and kind of each component of the composite for manufacturing the article according to an embodiment may be controlled to increase the tensile strength up to about 1,500 $kgf/cm^2$, which is similar to that of the article manufactured from the liquid crystal polymer alone.

Therefore, the article according to an embodiment has improved moisture transmission resistivity, tracking resistance, and heat dissipation properties, and thus may be applied to various fields requiring such characteristics. For example, the article may be manufactured into a battery case.

Accordingly, a battery case according to an embodiment includes a container configured to accommodate an electrode assembly, the container includes a bottom wall, a plurality of side walls, and an open side opposed to the bottom wall, wherein the bottom wall and the plurality of side walls are integrated to provide a space for accommodating the electrode assembly, and wherein at least one of the bottom wall and the plurality of side walls has a water vapor transmission rate (WVTR) of less than about 0.007 $g/m^2/day$ as measured at a thickness of 1 mm and 38° C. under relative humidity of 100% according to ISO 15106 and ASTM F1249, a comparative tracking index (CTI) of greater than or equal to about 200 volts as measured according to UL 746A, ASTM D3638, or IEC60112, a thermal conductivity of greater than or equal to about 0.40 W/mK as measured by a laser flash, and a tensile strength of greater than or equal to about 1,000 $kgf/cm^2$ as measured according to ASTM D638 using UTM.

The battery case according to an embodiment includes the composite according to an embodiment, and thus has excellent moisture transmission resistivity, tracking resistance, and heat dissipation properties. Particularly, the moisture transmission resistivity is comparable to the moisture transmission resistivity level of a conventional exterior material of a metal pouch type that encloses an electrode assembly for a rechargeable lithium battery. Therefore, in the case of using the battery case according to an embodiment, a battery may be manufactured by introducing directly into the space for accommodating the electrode assembly in the battery case according to an embodiment, without a need to wrap separately manufactured electrode assemblies with an additional exterior material such as a metal pouch.

In addition, in an embodiment, the container of the battery case may include one or more partition walls extending from a first side wall to a second side wall of a plurality of side walls. The space in the container by the one or more partition walls may include two or more cell compartments, each accommodating two or more electrode assemblies. Therefore, after manufacturing a plurality of electrode assemblies, each of them is directly introduced into a plurality of cell compartments within the battery container, without needs to wrap them with metal pouches, or the like, to thereby easily manufacture a battery module including a plurality of battery cells. In other words, the battery case according to an embodiment may be a cell-module integrated battery case.

Conventionally, an electrode assembly including positive and negative electrodes is formed and then, wrapped with a metal pouch having moisture transmission resistivity to form a battery cell and then, packed in a metallic battery case to manufacture a battery module, which is complicated in terms of a process, takes a long time, and costs increasingly high. The battery case according to an embodiment makes it easier to manufacture a cell-module integrated battery and thus may have a great time- and cost-reducing effect in terms of a manufacturing cost and time of a battery module compared with a conventional metal battery case. In addition, the battery case according to an embodiment includes a polymer material as a main component and thus has a light weight and a shape flexibility, is manufactured at a low cost.

The battery case may be a battery case for a rechargeable lithium battery, but is not limited thereto, and may be a case for any battery requiring moisture transmission resistivity, tracking resistance, heat dissipation properties, or a combination thereof.

On the other hand, the battery case may further include, for example, a lid configured to close at least one portion of the open side of the container. The lid may have at least one of a positive terminal and a negative terminal, for example, both of the positive terminal and the negative terminal, and the battery in the battery case may be electrically connected to the outside of the battery case through these positive and/or negative terminals.

In an embodiment, at least one of the bottom wall and the plurality of side walls which form the container of the battery case and the lid may include the composite according to an embodiment. In another embodiment, all the bottom wall and the plurality of side walls which form the container of the battery case and the lid may include the composite according to an embodiment.

The article or battery case according to an embodiment may be manufactured from the composite according to the embodiment. For example, the composite may be molded into an article, or battery case according to an embodiment having the desired size and shape according to the various plastic molding methods, for example, extrusion molding, injection molding, blow molding, press molding, and the like.

A battery according to an embodiment may be manufactured by accommodating a separately manufactured electrode assembly including positive and negative electrodes in a container of the battery case, injecting an electrolyte solution into the battery container accommodating the electrode assembly, and then, sealing the battery case.

The manufacturing method of the battery needs no process of packing an electrode assembly with a metal exterior material and thus includes simplified process steps and provides a battery fast and easily. Particularly, the battery case may be manufactured by freely forming at least one partition wall inside a space of the battery container to conveniently include at least two cell compartments partitioned by the at least one partition wall up to desired numbers and sizes. Accordingly, electrode assemblies manufactured up to the desired numbers and sizes may be simply introduced into respectively the at least two cell compartments without wrapping with an additional metal pouch and the like to freely manufacture a battery module including the desired number of electrode assemblies. This manufactured battery module has a much reduced total weight due to a lighter weight of the battery case and thus may contribute to energy efficiency.

Hereinafter, a battery case according to an embodiment is described with reference to the appended drawings.

Figure 1:
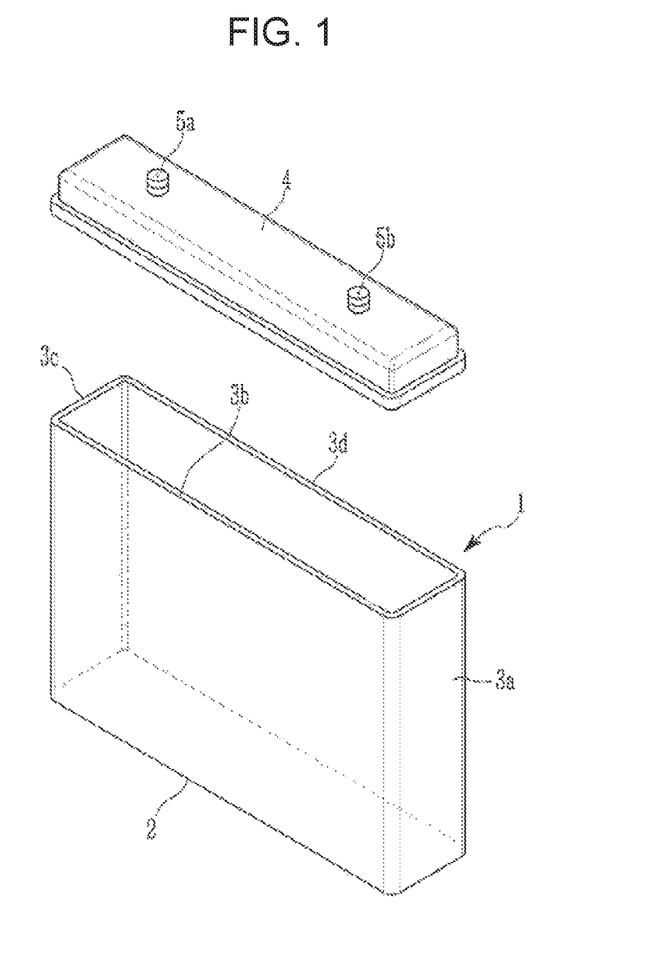
FIG. 1 is an exploded perspective view of a battery case according to an embodiment.

FIG. 1 is an exploded perspective view showing a battery case according to an embodiment.

Referring to FIG. 1, a battery case according to an embodiment includes a container 1 including a bottom wall 2 and a plurality of (e.g., 3, 4, or greater) side walls 3*a*, 3*b*, 3*c*, and 3*d* that are integrated to provide a space for accommodating an electrode assembly. The container 1 has an open side opposed (i.e., opposite) to the bottom wall 2 and an electrode assembly may be accommodated in the container 1 through the open side.

Herein, "integrated" indicates a state that the bottom wall is connected to the plurality of side walls, and thus all the other sides except for the open side provide a closed and sealed space. A method for this embodiment is not particularly limited but may include, for example, as described later, a method of preparing a composite from a composition including the polymer matrix, an inorganic moisture absorbent, one or more of a ceramic filler and graphite, and a tracking resistance polymer, and molding the composite to integrate the bottom wall and the plurality of side walls and to provide a container having a space for accommodating electrodes, or a method of separately molding the bottom wall and the plurality of side walls and then, connecting them in a publicly known method such as welding, boning, or the like. As described above, the method for integration is not limited to a particular method but may include various methods known to a person having an ordinary skill in the art, through which a container of a battery case is manufactured to have a space for accommodating an electrode assembly by integrating the bottom wall and the plurality of side walls.

The battery case may further include a lid 4 to close (e.g., seal) at least a portion, for example, a whole part of the open side of the container 1. The lid 4 may have at least one of the positive terminal 5a and the negative terminal 5b (e.g., positive terminal and negative terminal). The lid 4 may include the same material as the container 1 or a different material from the container 1 and the battery case according to an embodiment may be entirely sealed by covering the open side of the container 1 with the lid 4 and sealing the same.

Figure 2:
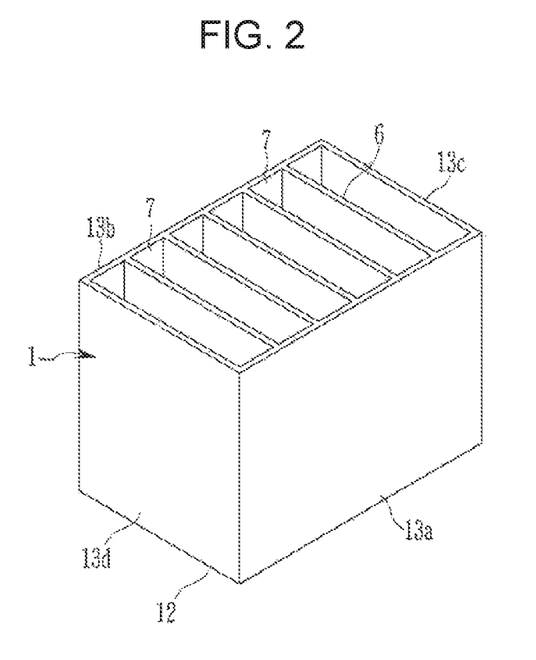
FIG. 2 is an exploded perspective view of a battery case according to another embodiment.

FIG. 2 is an exploded perspective view of a battery case according to another embodiment.

Referring to FIG. 2, a container 1 of a battery case according to an embodiment has a space formed by integrating a bottom wall 12 with a plurality of side walls (e.g., 3, 4, or more) 13a, 13b, 13c, and 13d and an open side opposite the bottom wall 12, and in the space, at least one partition wall 6 (e.g., 2, 3, 4, 5, or more) is provided. Accordingly, the container may include a plurality of (e.g., greater than or equal to 2, for example, greater than or equal to 3, for example, greater than or equal to 4, or for example, greater than or equal to 5) cell compartments 7 by the partition wall 6. Each cell compartment 7 may include the electrode assembly that will be described later, and a battery module may be manufactured by accommodating at least two electrode assemblies in each cell compartment and injecting an electrolyte solution therein. After disposing the electrode assembly and injecting the electrolyte solution, the open side of the container 1 may be closed or sealed with a lid, which is not shown.

FIGS. 1 and 2 illustrate the container 1 of the parallelepiped battery case. However, the battery case according to an embodiment has no limit to the shape and may have various shapes and sizes.

Another embodiment provides a battery including the battery case according to the embodiment and an electrode assembly accommodated in the container of the battery case and including a positive electrode and a negative electrode. Details for the battery case are the same as described above.

The electrode assembly includes a positive electrode, a negative electrode, and a separator disposed therebetween. The electrode assembly may further include, for example an aqueous non-aqueous electrolyte solution in the separator. The types of the electrode assembly are not particularly limited. In an embodiment, the electrode assembly may include an electrode assembly for a rechargeable lithium battery. The positive electrode, the negative electrode, the separator, and the electrolyte solution of the electrode assembly may be appropriately selected according to types of the electrode and are not particularly limited. Hereinafter, the electrode assembly for a rechargeable lithium battery is exemplified but the present disclosure is not limited thereto.

The positive electrode may include, for example, a positive active material disposed on a positive current collector and may further include at least one of a conductive material and a binder. The positive electrode may further include a filler. The negative electrode may include, for example a negative active material disposed on a negative current collector and may further include at least one of a conductive material and a binder. The negative electrode may further include a filler.

The positive active material may include, for example a (solid solution) oxide including lithium but is not particularly limited as long as it is a material capable of intercalating and deintercalating lithium ions electrochemically. The positive active material may be a layered compound such as lithium cobalt oxide ($LiCo_2$), lithium nickel oxide ($LiNiO_2$), and the like, a compound substituted with one or more transition metal; a lithium manganese oxide such as chemical formulae $Li_{1+x}Mn_{2-x}O_4$ (wherein, x is 0 to 0.33), $LiMnO_3$, $LiMn_2O_3$, $LiMnO_2$, and the like; lithium copper oxide ($Li_2CuO_2$); vanadium oxide such as $LiV_3O_8$, $LiFe_3O_4$, $V_2O_5$, $Cu_2V_2O_7$, and the like; a Ni site-type lithium nickel oxide represented by chemical formula $Li_{1-x}M_xO_4$ (wherein, M=Co, Mn, Al, Cu, Fe, Mg, B, or Ga and x=0.01 to 0.3); a lithium manganese composite oxide represented by chemical formula $LiMn_{2-x}M_xO_2$ (wherein, M=Co, Ni, Fe, Cr, Zn, or Ta and x=0.01 to 0.1) or $Li_2Mn_3MO_8$ (wherein, M=Fe, Co, Ni, Cu, or Zn); $LiMn_2O_4$ where a portion of Li of chemical formula is substituted with an alkaline-earth metal ion; a disulfide compound; $Fe_2(MoO_4)_3$, and the like, but is not limited thereto.

Examples of the conductive material may include carbon black such as Ketjen black, acetylene black, and the like, natural graphite, artificial graphite, and the like, but is not particularly limited as long as it may increase conductivity of the positive electrode.

The binder may be for example, polyvinylidene fluoride, an ethylene-propylene-diene terpolymer, a styrene-butadiene rubber, an acrylonitrile-butadiene rubber, a fluorine rubber, polyvinyl acetate, polymethylmethacrylate, polyethylene, nitrocellulose, and the like, but is not particularly limited as long as it may bind the (positive or negative) active material and the conductive material on the current collector. Examples of the binder may be polyvinyl alcohol, carboxymethyl cellulose (CMC), starch, hydroxypropyl cellulose, recycled cellulose, tetrafluoroethylene, polyethylene, polypropylene, an ethylene-propylene-diene polymer (EPDM), sulfonated EPDM, a styrene-butene rubber, a fluorine rubber, various copolymers, polymeric highly saponified polyvinyl alcohol, and the like in addition to the foregoing materials.

The negative active material may be for example, carbon and graphite materials such as natural graphite, artificial graphite, expanded graphite, carbon fiber, non-graphitic carbon, carbon black, carbon nanotube, fullerene, activated carbon, and the like; a metal such as Al, Si, Sn, Ag, Bi, Mg, Zn, In, Ge, Pb, Pd, Pt, Ti, and the like that may be an alloy with lithium and a compound including such an element; a composite material of a metal and a compound thereof and carbon and graphite materials; a lithium-containing nitride, and the like. Among them, carbon-based active materials, silicon-based active materials, tin-based active materials, or silicon-carbon-based active materials may be desirably used and may be used alone or in a combination of two or more.

The separator is not particularly limited and may be any separator of a rechargeable lithium battery. For example, a porous film or non-woven fabric having excellent high rate discharge performance may be used alone or in a mixture thereof. The separator may include pores and the pores may have generally a pore diameter of about 0.01 μm to about 10 μm and a thickness of about 5 μm to about 300 μm. A substrate of the separator may include, for example, a polyolefin-based resin, a polyester-based resin, poly(vinylidene fluoride) (PVDF), a poly(vinylidene fluoride-hexafluoropropylene) copolymer, a poly(vinylidene fluoride-perfluorovinylether) copolymer, a poly(vinylidene fluoride-tetrafluoroethylene) copolymer, a poly(vinylidene fluoride-trifluoroethylene) copolymer, a poly(vinylidene fluoride-fluoroethylene) copolymer, a poly(vinylidene fluoride-hexafluoroacetone) copolymer, a poly(vinylidene fluoride-ethylene) copolymer, a poly(vinylidene fluoride-propylene) copolymer, a poly(vinylidene fluoride-trifluoropropylene) copolymer, a poly(vinylidene fluoride-tetrafluoroethylene-hexafluoropropylene) copolymer, a poly (vinylidene fluoride-ethylene-tetrafluoroethylene) copolymer, and the like. When the electrolyte is a solid electrolyte such as a polymer, the solid electrolyte may function as a separator.

The conductive material is a component to further improve conductivity of an active material and may be included in an amount of about 1 wt % to about 30 wt % based on a total weight of the electrode, but is not limited thereto. Such a conductive material is not particularly limited as long as it does not cause chemical changes of a battery and has conductivity, and may be for example, graphite such as natural graphite or artificial graphite; carbon black such as carbon black, acetylene black, Ketjen black, channel black, furnace black, lamp black, summer black, and the like; a carbon derivative such as carbon nanotube, fullerene, and the like, a conductive fiber such as a carbon fiber or a metal fiber, and the like; carbon fluoride, a metal powder such as aluminum, a nickel powder, and the like; a conductive whisker such as zinc oxide, potassium titanate, and the like; a conductive metal oxide such as a titanium oxide; a conductive material such as a polyphenylene derivative, and the like.

The filler is an auxiliary component to suppress expansion of an electrode, is not particularly limited as long as it does not cause chemical changes of a battery and is a fiber-shaped material, and may be for example, an olefin-based polymer such as polyethylene, polypropylene, and the like; a fiber-shaped material such as a glass fiber, a carbon fiber, and the like.

In the electrode, the current collector may be a site where electron transports in an electrochemical reaction of the active material and may be a negative current collector and a positive current collector according to types of the electrode. The negative current collector may have a thickness of about 3 μm to about 500 μm. The negative current collector is not particularly limited as long as it does not cause chemical changes of a battery and has conductivity and may be, for example, copper, stainless steel, aluminum, nickel, titanium, fired carbon, copper or stainless steel that is surface-treated with carbon, nickel, titanium, silver, or the like, an aluminum-cadmium alloy, and the like.

The positive current collector may have a thickness of about 3 μm to about 500 μm, but is not limited thereto. Such a positive current collector is not particularly limited as long as it does not cause chemical changes of a battery and has high conductivity and may be, for example, stainless steel, aluminum, nickel, titanium, fired carbon, or aluminum or stainless steel that is surface-treated with carbon, nickel, titanium, silver, or the like.

The current collectors may have a fine concavo-convex on its surface to reinforce a binding force of the active material and may be used in various shapes of a film, a sheet, a foil, a net, a porous film, a foam, a non-woven fabric, or the like.

The lithium-containing non-aqueous electrolyte solution may consist of a non-aqueous electrolyte and a lithium salt.

The non-aqueous electrolyte may be, for example, an aprotic organic solvent such as N-methyl-2-pyrrolidinone, propylene carbonate, ethylene carbonate, butylene carbonate, dimethyl carbonate, diethyl carbonate, gamma-butyro lactone, 1,2-dimethoxy ethane, tetrahydrofuran, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, a dioxolane derivative, sulfolane, methyl sulfolane, 1,3-dimethyl-2-imidazolidinone, a propylene carbonate derivative, a tetrahydrofuran derivative, ether, methyl propionate, ethyl propionate, and the like.

The lithium salt is a material that is dissolved in the non-aqueous electrolyte solution and may be, for example, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborane, lower aliphatic lithium carbonate, lithium 4-phenyl borate, imide, and the like.

An organic solid electrolyte, an inorganic solid electrolyte, and the like may be used as needed.

The organic solid electrolyte may be, for example, polyethylene derivative, a polyethylene oxide derivative, a polypropylene oxide derivative, a phosphoric acid ester polymer, a poly agitation lysine, polyester sulfide, polyvinyl alcohol, polyvinylidene fluoride, a polymer including an ionic leaving group, and the like.

The inorganic solid electrolyte may be, for example, nitrides of Li such as $Li_3N$, $LiI$, $Li5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, $Li_3PO_4$—$Li_2S$—$SiS_2$, and the like, halides, sulfates, and the like.

The non-aqueous electrolyte solution may include, for example, pyridine, triethylphosphite, triethanolamine, cyclic ether, ethylene diamine, diglyme, hexa phosphoric trisamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride in order to improve charge and discharge characteristics, flame retardancy, and the like. As needed, in order to endow inflammability, a halogen-containing solvent such as carbon tetrachloride, ethylene trifluoride, and the like may be further added and in order to improve high temperature storage characteristics, carbon dioxide gas may be further added.

As described above, a battery including the battery case according to an embodiment does not need to be manufactured in a unit cell including an exterior material made of an additional moisture transmission resistivity material in an electrode assembly, and thus, an electrode assembly accommodated in a container of the battery case does not include exterior materials.

Hereinafter, the embodiments are described with reference to examples and comparative examples. The following examples and comparative examples are exemplary but do not limit the scope of the present disclosure.

EXAMPLES

Examples 1 to 12 and Comparative Examples 1 to 11: Preparation of Evaluation of Composite and Article The composites of Examples 1 to 12 were obtained by using a combination of a liquid crystal polymer (LCP) as a polymer matrix, polytetrafluoroethylene (PTFE), polybutylene (PBT), high density polyethylene (HDPE), or a combination thereof as a tracking resistance polymer(s), calcium oxide (CaO) as an inorganic moisture absorber, and boron nitride (BN), graphite, or a combination thereof as a filler for heat dissipation properties. The content of each component in the composites are shown in Table 1.

Specifically, the components shown in Table 1 were charged in a twin-screw extruder, and then melted and mixed to manufacture each pellet. The temperature profile of the extruder was controlled by dividing a temperature range of 160° C. at an inlet and 240° C. at an outlet, and a screw speed was in a range of 60 to 100 revolutions per minute (rpm), for example 80 rpm. The obtained pellet was put in an injector and molded to manufacture a disk-shaped article having a thickness of about 1 millimeter (mm) and a diameter of 30 mm.

The liquid crystal polymer used to manufacture the composite according to Example is obtained by copolymerizing 40 mole percent (mol %) of HBA (hydroxybenzoic acid), 30 mol % of IPA (isophthalic acid), 20 mol % of HQ (hydroquinone), and 10 mol % of BP (4,4'-biphenol).

As for PTFE and PBT used as the tracking resistance polymer, the PTFE polymer was LUBEFLON® K 401 made by Polis S.r.l. (average particle size 8 micrometers (μm)) and the PBT polymer was 211M made by Samyang Corporation (an acid value 20 meq/kg). The high density polyethylene (HDPE) has density of greater than or equal to about 0.960 grams per cubic centimeter ($g/cm^3$).

The calcium oxide (CaO) used as the inorganic moisture absorber was ANFOGEN #600H made by Hwasung Chemical Co., Ltd. (average particle size 3 μm).

The BN used as the ceramic filler was CFP007HS made by 3M™ (average particle size 5 to 8 μm; surface area less than or equal to 15 $m^2/g$).

In addition, as for the graphite component, the expanded graphite was TIMREX® C-THERM™ 011 made by Imerys.

The amounts of the components used in the composites of Comparative Examples 1 to 11 are shown in Table 2, and the composites were prepared by injection-molding the respective components into pellets in the same method as in Examples 1 to 12.

The composite of Comparative Example 1 was prepared by molding the liquid crystal polymer alone into a pellet without including the other composite components. The composite of Comparative Example 2 was prepared by molding the liquid crystal polymer, CaO as the inorganic moisture absorber and BN as the filler having heat dissipation properties.

In addition, the composites of Comparative Examples 3 and 4 were prepared by molding the liquid crystal polymer, PBT as the tracking resistance polymer, CaO as the inorganic moisture absorber, and BN as the filler having heat dissipation properties.

In addition, the composites of Comparative Examples 5 and 6 were respectively prepared by molding the liquid crystal polymer, CaO as the inorganic moisture absorber, BN as the filler having heat dissipation properties, and $TiO_2$ (Comparative Example 5) or zinc borate (ZnB; Comparative Example 6)) instead of the tracking resistance polymer. Herein, the $TiO_2$ used was titanium oxide (rutile) made by Shanghai Aladdin Bio-Chem Technology Co., Ltd., and the ZnB used was ZB-400 made by Zibo Wuwei Industrial Co., Ltd.

On the other hand, Comparative Example 7 was a composite prepared by molding the liquid crystal polymer, PBT as the tracking resistance polymer, and CaO as the inorganic moisture absorber. Comparative Example 8 was a composite prepared by molding the liquid crystal polymer, PBT as the tracking resistance polymer, and BN as the filler having heat dissipation properties. Comparative Examples 9 and 10 were composites prepared by including the liquid crystal polymer, PBT as the tracking resistance polymer, CaO as the inorganic moisture absorber, and BN as the filler having heat dissipation properties, where the inorganic moisture absorber and BN are included in different amounts in Comparative Examples 9 and 10.

Comparative Example 11 was a composite prepared by molding the liquid crystal polymer, PBT as the tracking resistance polymer, CaO as the inorganic moisture absorber, and graphite as the filler having heat dissipation properties.

The pellets of the extruded composites according to Examples 1 to 12 and Comparative Examples 1 to 11 were measured with respect to a comparative tracking index (CTI), a water vapor transmission rate (WVTR), thermal conductivity (W/mK), and tensile strength ($kgf/cm^2$), which are provided in Tables 1 and 2.

The comparative tracking index, water vapor transmission rate, thermal conductivity and tensile strength were measured as follows.

Comparative tracking index (CTI) was measured by putting a pellet sample on a glass substrate for measuring CTI, dripping an electrolyte solution (a 0.1% $NH_4Cl$ aqueous solution) at a rate of one drop every 30 seconds for a total of 50 drops, and measuring a voltage (up to 600 volts at maximum) where a short-cut occurs due to tracking according to UL 746A, ASTM D3638, or IEC60112.

Water vapor transmission rate (WVTR) was measured using an Aquatran2 made by Mocon, Inc. at 38° C. under relative humidity of 100% according to ISO15106-3.

Thermal conductivity was obtained by measuring vertical direction thermal conductivity in a laser flash method.

Tensile strength was measured according to ASTM D638 using a Universal Testing Machine (UTM).

TABLE 1

| | Polymer components (wt %) | | | | Inorganic material components (wt %) | | | | | CTI | WVTR | Thermal conductivity | Tensile strength |
|---|---|---|---|---|---|---|---|---|---|---|---|---|---|
| | | | | | | | Expanded | | | | | | |
| | LCP | PTFE | PBT | HDPE | CaO | BN | graphite | $TiO_2$ | ZnB | (V) | ($g/m^2/day$) | (W/mK) | ($kgf/cm^2$) |
| Ex. 1 | 75 | — | 10 | — | 5 | 10 | — | — | — | 200 | 0.0006 | 0.44 | 1,500 |
| Ex. 2 | 65 | 20 | — | — | 5 | 10 | — | — | — | 225 | 0.0009 | 0.45 | 1,310 |
| Ex. 3 | 65 | — | 20 | — | 5 | 10 | — | — | — | 225 | 0.0010 | 0.48 | 1,250 |
| Ex. 4 | 55 | — | 30 | — | 5 | 10 | — | — | — | 250 | 0.0030 | 0.50 | 1,120 |
| Ex. 5 | 65 | — | — | 20 | 5 | 10 | — | — | — | 225 | 0.0010 | 0.45 | 1,160 |
| Ex. 6 | 65 | 10 | 10 | — | 5 | 10 | — | — | — | 225 | 0.0009 | 0.46 | 1,280 |

TABLE 1-continued

| | Polymer components (wt %) | | | | Inorganic material components (wt %) | | | | | CTI (V) | WVTR (g/m²/day) | Thermal conductivity (W/mK) | Tensile strength (kgf/cm²) |
|---|---|---|---|---|---|---|---|---|---|---|---|---|---|
| | LCP | PTFE | PBT | HDPE | CaO | BN | Expanded graphite | TiO₂ | ZnB | | | | |
| Ex. 7 | 60 | — | 20 | — | 10 | 10 | — | — | — | 225 | <0.0005 | 0.53 | 1,210 |
| Ex. 8 | 50 | — | 20 | — | 20 | 10 | — | — | — | 225 | <0.0005 | 0.57 | 1,100 |
| Ex. 9 | 40 | — | 20 | — | 20 | 20 | — | — | — | 225 | <0.0005 | 0.72 | 1,030 |
| Ex. 10 | 70 | — | 20 | — | 5 | 5 | — | — | — | 225 | 0.0020 | 0.40 | 1,310 |
| Ex. 11 | 65 | — | 20 | — | 5 | —* | 10 | — | — | 200 | 0.0010 | 0.65 | 1,280 |
| Ex. 12 | 82 | — | 10 | — | 3 | 5 | — | — | — | 200 | 0.0030 | 0.40 | 1,520 |

TABLE 2

| | Polymer components (wt %) | | | | Inorganic material components (wt %) | | | | | CTI (V) | WVTR (g/m²/day) | Thermal conductivity (W/mK) | Tensile strength (kgf/cm²) |
|---|---|---|---|---|---|---|---|---|---|---|---|---|---|
| | LCP | PTFE | PBT | HDPE | CaO | BN | Expanded graphite | TiO₂ | ZnB | | | | |
| Comp. Ex. 1 | 100 | — | — | — | — | — | — | — | — | 125 | 0.07 | 0.25 | 1,600 |
| Comp. Ex. 2 | 85 | — | — | — | 5 | 10 | — | — | — | 125 | 0.0005 | 0.43 | 1,550 |
| Comp. Ex. 3 | 80 | — | 5 | — | 5 | 10 | — | — | — | 125 | 0.0006 | 0.44 | 1,520 |
| Comp. Ex. 4 | 45 | — | 40 | — | 5 | 10 | — | — | — | 275 | 0.0080 | 0.52 | 950 |
| Comp. Ex. 5 | 65 | — | — | — | 5 | 10 | — | 20 | — | 125 | 0.0030 | 0.61 | 1,020 |
| Comp. Ex. 6 | 65 | — | — | — | 5 | 10 | — | — | 20 | 125 | 0.01 | 0.59 | 1,100 |
| Comp. Ex. 7 | 75 | — | 20 | — | 5 | — | — | — | — | 225 | 0.0030 | 0.29 | 1,350 |
| Comp. Ex. 8 | 70 | — | 20 | — | — | 10 | — | — | — | 225 | 0.09 | 0.43 | 1,320 |
| Comp. Ex. 9 | 40 | — | 20 | — | 30 | 10 | — | — | — | 200 | <0.0005 | 0.68 | 920 |
| Comp. Ex. 10 | 45 | — | 20 | — | 5 | 30 | — | — | — | 200 | 0.0009 | 0.89 | 980 |
| Comp. Ex. 11 | 45 | — | 20 | — | 5 | — | 30 | — | — | 175 | 0.0009 | 0.96 | 950 |

As shown in Table 1 and Table 2, articles of the composites including LCP, the tracking resistance polymer, the inorganic moisture absorber, and either the ceramic filler (BN) according to Examples 1 to 10 and 12, or the expanded graphite according to Example 11, have a water vapor transmission rate of less than 0.007 g/m²/day, which is greater than or equal to 10 times decreased from that of the article including the liquid crystal polymer alone according to Comparative Example 1.

In addition, the articles of Examples 1 to 12 achieved a CTI of greater than or equal to 200 volts, whereas the articles of Comparative Examples 1 and 2 and Comparative Examples 5 and 6, each including no tracking resistance polymer, have a CTI of 125 volts, which is at least 35% less than the CTI of the articles of Examples 1 to 12. Particularly, it is noted that Comparative Examples 5 and 6 were prepared by replacing the tracking resistance polymer with either titania or ZnB, respectively. The results show that the conventionally used additives for improving tracking resistance, such as titania and ZnB, were unable to match the tracking resistance improvement effect achieved when using the tracking resistance polymer.

In addition, compared with the articles including BN as the ceramic filler or expanded graphite according to Examples 1 to 12, the articles including none of these components according to Comparative Examples 1 and 7 show reduced thermal conductivity.

On the other hand, the article of Comparative Example 9 including 30 wt % of CaO as the inorganic moisture absorber achieves a significant decrease in water vapor transmission rate but also large decreases in tensile strength and CTI. However, Examples 8 and 9 including 20 wt % of the inorganic moisture absorber achieve a CTI of 225 volts, a WVTR of less than 0.0005 g/m²/day, and high thermal conductivity without a large decrease in tensile strength decrease. In other words, when the inorganic moisture absorber is included in an amount of greater than 20 wt % based on a total weight of the composite, moisture transmission resistivity of an article manufactured therefrom may be increased, but the other properties, for example, tracking resistance and particularly, mechanical properties are greatly decreased, and accordingly, the inorganic moisture absorber may be included in an amount of less than or equal to 20%.

In addition, the article of Comparative Example 11 including 30 wt % of expanded graphite in order to improve heat dissipation properties shows greatly increased thermal conductivity of 0.96 W/mK but also a tracking phenomenon due to the expanded graphite, and thus a CTI of 175 volts, even though 20 wt % of PBT as the tracking resistance polymer is included. It is noted that Example 11 including the same amount of PBT and 10 wt % of graphite achieves a CT of 200 volts. Comparative Example 11 has a water vapor transmission rate that is decreased, and tensile strength is decreased relative to Example 11. In addition, Comparative Example 10 includes 30 wt % of BN as the ceramic filler and thus shows increased thermal conductivity of 0.68 W/mK and a decreased CTI of 200 volts, and an increased water vapor transmission rate and greatly decreased tensile strength, compared with those of Examples 1 and 10 including the inorganic moisture absorber and the tracking resistance polymer in the same amount as above and BN in an amount of 10 wt % or 5 wt %, respectively. In other words, when the ceramic filler or graphite for improving heat dissipation properties is included in an amount of greater than 20 wt % based on a total weight of the composite, the resulting tracking resistance, moisture transmission resistivity, mechanical properties, and the like of an article manufactured therefrom are decreased, and accordingly, the ceramic filler or graphite should be included in an amount of less than or equal to 20 wt %. As described above, Example 9 including an inorganic moisture absorber and BN each in the amount of 20 wt % shows excellent CTI, WVTR, and thermal conductivity properties and also, a tensile strength of greater than or equal to 1,000 kgf/cm$^2$.

As shown above, an article manufactured from the composite including the tracking resistance polymer, the inorganic moisture absorber, and the ceramic filler and/or graphite in the polymer matrix according to an embodiment may secure excellent moisture transmission resistivity and simultaneously, excellent tracking resistance and heat dissipation properties, but mechanical properties thereof are not much decreased. Accordingly, the composite according to an embodiment or an article including the same may be used for a battery case for a rechargeable lithium battery requiring high moisture transmission resistivity, tracking resistance, and heat dissipation properties, or a rechargeable lithium battery or a battery module including the same.

While this disclosure has been described in connection with what is presently considered to be practical example embodiments, it is to be understood that the scope of the disclosure is not limited to the disclosed exemplary embodiments. On the contrary, it is intended to cover various modifications and equivalent arrangements included within the spirit and scope of the appended claims.

What is claimed is:

1. An article manufactured by molding a composite, the composite comprising:
    (A) a polymer matrix; and
    (B) (i) a inorganic moisture absorber, (ii) a ceramic filler, graphite, or a combination thereof, and (iii) a tracking resistance polymer, which are dispersed in the polymer matrix,
    wherein the polymer matrix comprises a liquid crystal polymer, wherein the liquid crystal polymer is present in an amount of greater than or equal to 30 weight percent to less than 80 weight percent based on a total weight of the composite;
    wherein the inorganic moisture absorber is present in an amount of greater than or equal to 1 weight percent to less than or equal to 20 weight percent, based on a total weight of the composite;
    wherein the ceramic filler, the graphite, or the combination thereof is present in an amount of greater than or equal to 1 weight percent to less than or equal to 20 weight percent, based on a total weight of the composite; and
    wherein the tracking resistance polymer is present in an amount of greater than or equal to 10 weight percent to less than or equal to 35 weight percent based on a total weight of the composite,
    wherein the tracking resistance polymer comprises:
    an average bond energy between an atom forming a main chain in the tracking resistance polymer and another atom covalently bonded to the atom that forms the main chain in the tracking resistance polymer of about 350 kilojoules per mole to about 500 kilojoules per mole,
    a carbonaceous residue yield after pyrolysis of less than or equal to about 5 weight percent, based on the amount of the tracking resistance polymer before pyrolysis, or a combination thereof,
    wherein the article is a container comprising a bottom wall, a plurality of side walls, and an open side opposed to the bottom wall, and
    wherein at least one of the bottom wall and the plurality of side walls comprises the composite, and the composite defines inner and outer surfaces of the at least one of the bottom wall and the plurality of side walls.

2. The article of claim 1, wherein the polymer matrix further comprises high density polyethylene.

3. The article of claim 1, wherein the tracking resistance polymer has an average bond energy between an atom forming the main chain in the tracking resistance polymer and another atom covalently bonded to the atom that forms the main chain in the tracking resistance polymer of about 350 kilojoules per mole to about 500 kilojoules per mole, and the tracking resistance polymer is poly(tetrafluoroethylene), poly(ethylene tetrafluoroethylene), poly(vinylidene fluoride), poly(chlorotrifluoroethylene), a copolymer thereof, or a combination thereof.

4. The article of claim 1, wherein the tracking resistance polymer has the carbonaceous residue yield of the tracking resistance polymer after pyrolysis of less than or equal to about 5 weight percent, based on the amount of the tracking resistance polymer before pyrolysis, and the tracking resistance polymer is polybutylene terephthalate, polyethylene, a copolymer thereof, or a combination thereof.

5. The article of claim 1, wherein the inorganic moisture absorber is a silica gel, a zeolite, CaO, BaO, $MgSO_4$, $Mg(ClO_4)_2$, MgO, $P_2O_5$, $Al_2O_3$, $CaH_2$, NaH, $LiAlH_4$, $CaSO_4$, $Na_2SO_4$, $CaCO_3$, $K_2CO_3$, $CaCl_2$, $Ba(ClO_4)_2$, Ca, or a combination thereof.

6. The article of claim 1, wherein the inorganic moisture absorber is MgO, CaO, a zeolite, or a combination thereof.

7. The article of claim 1, wherein the ceramic filler has a thermal conductivity of greater than or equal to about 20 watts per millikelvin.

8. The article of claim 1, wherein the ceramic filler is BN, AlN, $Al_2O_3$, SiC, BeO, or a combination thereof.

9. The article of claim 1, wherein the graphite comprises expanded graphite.

10. The article of claim 1, wherein the composite comprises the polymer matrix in an amount of greater than or equal to 35 weight percent to less than or equal to 75 weight percent, based on a total weight of the composite.

11. The article of claim 1, wherein the composite comprises the tracking resistance polymer in an amount of greater than or equal to 10 weight percent to less than or equal to 30 weight percent, based on a total weight of the composite.

12. The article of claim 1, wherein the composite comprises the inorganic moisture absorber in an amount of greater than or equal to 3 weight percent to less than or equal to 20 weight percent, based on a total weight of the composite.

13. The article of claim 1, wherein the composite comprises the one or more of a ceramic filler and graphite in an amount of greater than or equal to 3 weight percent to less than or equal to 20 weight percent, based on a total weight of the composite.

14. The article of claim 1, wherein the article has
    a water vapor transmission rate of less than about 0.007 grams per square meter per day as measured at a thickness of 1 millimeter at 38° C. and relative humidity of 100% according to ISO 15106 or ASTM F1249,
    a comparative tracking index of greater than or equal to about 200 volts as measured according to UL 746A, ASTM D3638, or IEC60112,
    a thermal conductivity of greater than or equal to about 0.40 watts per millikelvin as measured by a laser flash, and a tensile strength of greater than or equal to about 1,000 kilograms per square centimeter as measured according to ASTM D638 using a Universal Testing Machine.

* * * * *